US 6,602,478 B2

(12) United States Patent
Brundage

(10) Patent No.: US 6,602,478 B2
(45) Date of Patent: Aug. 5, 2003

(54) PROCESS FOR CONTROLLING CARBON MONOXIDE CONCENTRATION OUT OF A PREFERENTIAL OXIDATION REACTOR DURING TURNDOWN USING STAGED MULTI-PORT AIR INJECTION

(75) Inventor: Mark A. Brundage, Pittsford, NY (US)

(73) Assignee: General Motors Corporation, Detroit, MI (US)

( * ) Notice: Subject to any disclaimer, the term of this patent is extended or adjusted under 35 U.S.C. 154(b) by 158 days.

(21) Appl. No.: 09/812,062

(22) Filed: Mar. 19, 2001

(65) Prior Publication Data

US 2002/0132149 A1 Sep. 19, 2002

(51) Int. Cl.[7] .......................... B01J 12/00; F28D 21/00; H01M 8/06
(52) U.S. Cl. .......................... 422/194; 422/193; 429/19; 429/20
(58) Field of Search ................... 422/193–195, 422/198, 205, 211, 220; 165/166; 429/20, 26, 17, 19, 23

(56) References Cited

U.S. PATENT DOCUMENTS

| 5,316,747 A | | 5/1994 | Pow et al. ................. 423/247 |
| 5,456,889 A | * | 10/1995 | Pow et al. ................. 422/173 |
| 5,518,705 A | * | 5/1996 | Buswell et al. .......... 423/437.2 |
| 5,874,051 A | * | 2/1999 | Heil et al. .................. 422/171 |
| 6,132,689 A | * | 10/2000 | Skala et al. ................ 422/193 |
| 6,162,558 A | * | 12/2000 | Borup et al. .................. 429/19 |
| 6,455,008 B1 | * | 9/2002 | Aoyama et al. ............. 422/108 |

FOREIGN PATENT DOCUMENTS

EP 0827227 7/1997

* cited by examiner

Primary Examiner—Patrick Ryan
Assistant Examiner—Tracy Dove
(74) Attorney, Agent, or Firm—Cary W. Brooks

(57) ABSTRACT

A process of operating a multi-stage, isothermal, carbon monoxide preferential oxidation (PrOx) reactor. The reactor preferably including a plurality air injectors, positioned along the length of the $H_2$-rich gas flow path through the reactor, for injecting varying amounts of air at each injector depending on the electrical load demand on an associated fuel cell stack, or depending on the concentration of CO exiting the reactor. During normal or peak operating conditions of the fuel cell stack a majority of the air is injected through injectors position closer to the reformate gas inlet to the reactor. Upon a turndown of the electrical load demand on the fuel cell stack, a majority of the air is injected through the injectors closer the to reactor outlet thus eliminating or substantially reducing a reverse water gas shift reaction and substantially reducing the reaction of oxygen and hydrogen flowing through the PrOx.

18 Claims, 2 Drawing Sheets

PROCESS FOR CONTROLLING CARBON MONOXIDE CONCENTRATION OUT OF A PREFERENTIAL OXIDATION REACTOR DURING TURNDOWN USING STAGED MULTI-PORT AIR INJECTION

TECHNICAL FIELD

The present invention relates to a process of operating a multi-stage, isothermal reactor for the preferential oxidation of carbon monoxide in a hydrogen-rich fuel stream for a fuel cell.

BACKGROUND OF THE INVENTION

One type of fuel cell uses hydrogen as a fuel and oxygen (as air) as an oxidant. The hydrogen used in the fuel cell can be derived from the reformation of methanol or other organics (e.g. hydrocarbons). For example, in the methanol reformation process, methanol and water (as steam) are ideally reacted in a catalytic reactor (a.k.a. "reformer") to generate a reformate gas comprising hydrogen and carbon dioxide according to the reaction:

$$CH_3OH + H_2O \rightarrow CO_2 + 3H_2$$

One such reformer is described in U.S. Pat. No. 4,650,727 to Vanderborgh et al, issued May 17, 1987, the disclosure of which is hereby incorporated by reference. Unfortunately, the reformats exiting the reformer also contains undesirably high concentrations of carbon monoxide most of which must be removed to prevent poisoning of the catalyst of the fuel cell's anode. In this regard, carbon monoxide (i.e., about 1–3 mole %) contained in the $H_2$-rich reformate/effluent exiting the reformer must be reduced to very low nontoxic concentrations (i.e., less than about 20 ppm) to avoid poisoning of the anode.

It is known that the carbon monoxide, CO, level of the reformate/effluent exiting a methanol reformer can be reduced by utilizing a so-call "shift" reaction wherein water (i.e. steam) is added to the methanol reformate/effluent exiting the reformer, in the presence of a suitable catalyst. This lowers the carbon monoxide content of the reformate according to the following ideal shift reaction:

$$CO + H_2O \rightarrow CO_2 + H_2$$

Some (i.e., about 0.5 mole % or more) CO still survives the shift reaction, and any residual methanol in the reformate is converted to carbon dioxide and hydrogen in the shift reactor. Hence, shift reactor effluent comprises hydrogen, carbon dioxide, water and carbon monoxide.

The shift reaction is not enough to reduce the CO content of the reformate enough (i.e., to below about 20 ppm). Therefore, it is necessary to further remove carbon monoxide from the hydrogen-rich reformate stream exiting the shift reactor, and prior to supplying it to the fuel cell. It is known to further reduce the CO content of $H_2$-rich reformate exiting the shift reactor by a so-called "PrOx" (i.e., preferential oxidation) reaction effected in a suitable PrOx reactor operated at temperatures which promote the preferential oxidation of the CO by air in the presence of the $H_2$, but without consuming/oxidizing substantial quantities of the $H_2$ or triggering the so-called "reverse water gas shift" (RWGS) reaction. The PrOx process is described in a paper entitled "Methanol Fuel Processing for Low Temperature Fuel Cells" published in the Program and Abstracts of the 1988 Fuel Cell Seminar, Oct. 23–26, 1988, Long Beach, Calif., and in Vanderborgh et al U.S. Pat. No. 5,271,916, inter alia, the disclosures which are hereby incorporated by reference.

Desirably, the $O_2$ required for the PrOx reaction will be about two times the stoichiometric amount required to react the CO in the reformate. If the amount of $O_2$ exceeds about two times the stoichiometric amount needed, excessive consumption of $H_2$ results. On the other hand, if the amount of $O_2$ is substantially less than about two times the stoichiometric amount needed, insufficient CO oxidation will occur. Accordingly in practice, many practitioners use about 4 or more times the stoichiometric amount of $O_2$ than is theoretically required to react with the CO.

PrOx reactors may be either (1) adiabatic (i.e. where the temperature of the reactor is allowed to rise during oxidation of the CO), or (2) isothermal (i.e. where the temperature the reactor is maintained substantially constant during oxidation of the CO). The adiabatic PrOx process is sometimes effected via a number of sequential stages, which progressively reduce the CO content in stages, and requires careful temperature control, because if the temperature rises too much, the RWGS reaction can occur which counter productively produces more CO. The isothermal process can effect the same CO reduction as the adiabatic process, but in fewer stages and without concern for the RWGS reaction if (1) the reactor temperature can be kept low enough, and (2) $O_2$ depletion prior to the end of the reactor can be avoided.

In the PrOx reactor there are three main chemical reactions: 1) CO oxidation, $CO + 0.5\ O_2 \rightarrow CO_2$; 2) $H_2$ oxidation, $H_2 + 0.5\ O_2 \rightarrow H_2O$; and 3) Reverse-Water-Gas-Shift (RWGS) reaction, $CO_2 + H_2 \leftarrow \rightarrow H_2O + CO$ (RWGS). Reaction 1 is desired because it removes CO. Reaction 2 results in a loss of $H_2$, thus reducing efficiency and so it is undesired. Reaction 3 not only consumes $H_2$, but the reaction also results in the formation of CO, so it should be avoided. Reaction 1 and 2 directly compete for $O_2$ and are exothermic, with reaction 1 being more exothermic. Reaction 3 is an equilibrium reaction and mainly occurs after all the oxygen has been consumed, or as indicated above when the relative amount of $O_2$ with respect to the stoichiometric requirements has been substantially reduced. Reaction 3 is dependent on CO concentration and temperature (low CO and high temperature are more favorable for reaction 3) and thus good temperature control is essential.

Isothermal PrOx reactors and systems have been shown to meet the CO requirements (to prevent fuel cell stack poisoning) for both methanol and "gasoline" systems during normal operations (near steady state). However, during turndown situations (i.e., when the electrical load demand on the fuel cell stack has been substantially reduced), prior art PrOx reactor system have had some difficulty maintaining the CO concentration to acceptable levels due to increased residence time of the $H_2$-rich gas stream in the PrOx reactor, leading to increased RWGS reaction and higher CO levels. This can be overcome by utilizing more excess $O_2$, but as mentioned above the system efficiency is lowered.

The present invention overcomes some of the prior art deficiencies of operating a preferential oxidation reactor, particularly during turndown situations.

SUMMARY OF THE INVENTION

The present invention includes a process for controlling the carbon monoxide concentration out of a preferential oxidation reactor during turndown using staged multi-port air injection in a multi-stage, isothermal, carbon monoxide preferential oxidation (PrOx) reactor. The reactor preferably including a plurality air injectors, positioned along the length of the gas flow path through the reactor, for injecting varying amounts of air at each injector depending on the electrical load demand on an associated fuel cell stack, or depending on the concentration of CO exiting the reactor. During normal or peak operating conditions of the fuel cell stack, a majority of the air is injected through injectors positioned closer to the reformate gas inlet to the reactor. Upon a turndown of the electrical load demand on the fuel cell stack, a majority of the air is injected through the injectors more distant from the inlet and closer the to reactor outlet thus eliminating or substantially reducing the reverse water gas shift reaction, and substantially reducing the reaction of oxygen and hydrogen flowing through the PrOx.

The present invention includes a process of operating a multi-stage, isothermal, PrOx reactor for the selective reaction of CO with $O_2$ in a $H_2$-rich gas that flows through the reactor in order to reduce the CO content of the gas to a suitable level which is not toxic (i.e. below about 20 ppm) to a fuel cell catalyst. The reactor comprises a plurality of catalyzed heat exchangers serially arranged within a housing in the direction that the $H_2$-rich gas flows through the reactor. The several catalyzed heat exchangers promote the $CO+O_2$ reaction in a series of progressive steps in which the CO content of the gas is incrementally reduced from one catalyzed heat exchanger to the next as the gas flows through the catalyzed heat exchangers. The heat exchangers each comprise a plurality of thermally conductive barriers that separate the heat exchanger into (1) a plurality of first channels through which separate streams of the $H_2$-rich gas flow, and (2) a plurality of second channels through which a gaseous or liquid coolant flows to maintain the temperature of the heat exchanger substantially constant. Preferably, the channels are constructed and arranged such that the direction the coolant flows in the second channels is transverse the direction of $H_2$-rich gas flow in the first channels. Preferably, a single barrier separates a plurality of first channels from a single second channel, and most preferably, these first channels include a first channel from at least two different heat exchangers. The first channels have inlet and outlet ends for respectively admitting and exhausting the $H_2$-rich gas into and out of the first channels. The barriers separating the first and second channels each have (1) a catalyzed first surface confronting a first channel for promoting the $CO+O_2$ reaction therein, and (2) a second surface confronting a second channel for contacting the coolant in the second channel to extract heat from the catalyzed first surface, through the barrier, and maintain a substantially constant heat exchanger temperature that encourages the $CO+O_2$ reaction and discourages the formation of CO from the reaction of $CO_2$ with $H_2$ (i.e. the "reverse water gas shift reaction").

The reactor includes a mixing chamber between each of the heat exchangers. The mixing chamber communicates with the outlet ends of the first channels of the heat exchanger that is immediately upstream of the chamber and the inlet ends of the heat exchanger that is immediately down stream of the chamber. The mixing chambers will preferably be defined by the housing enclosing the heat exchangers, and serve to receive and substantially homogenize the $H_2$-rich gas streams exiting the upstream heat exchanger so as to distribute any unreacted $O_2$ and CO in those streams substantially uniformly throughout the gas before it enters the downstream catalyzed heat exchanger. So distributing the $O_2$ and CO intermediate the heat exchangers insures that more of the CO and $O_2$ will contact the catalyzed surface of the downstream heat exchanger(s) and be consumed in the reactor. In a preferred embodiment of the invention, each mixing chamber includes at least one air inlet (or injector) for receiving at least a portion of the $O_2$ required for the $CO+O_2$ injection into the chamber for mixing with the streams exiting from the upstream heat exchanger before they enter the downstream heat exchanger. During normal or peak operating conditions of the fuel cell stack, $O_2$ injection into the gas stream at various locations en route through the reactor promotes better consumption of the CO with less total $O_2$, and insures that there will always be some $O_2$ present in the $H_2$-rich gas stream at the outlet end of the last catalyzed heat exchanger in the series to suppress the reverse water gas shift reaction that could otherwise occur there in the absence of $O_2$.

According to an embodiment of the invention, the first surface of one of the barriers and the first surface of the next adjacent barrier are spaced from each other by at least one divider and together with the divider define first channels for at least two heat adjacent exchangers. These first channels of the two adjacent heat exchangers are most preferably substantially coplanar with each other, and are arranged and constructed to cause the gas therein to flow in opposite directions to each other.

The heat exchangers may be aligned end-to-end along an axis of the housing such that the outlet end of the upstream heat exchanger directly opposes the inlet end of the heat exchanger downstream of the chamber. Alternatively, the heat exchangers may be aligned side-by-side along an axis of the housing such that the inlet end of one heat exchanger is substantially coplanar with the outlet end of the next adjacent heat exchanger, and the chamber adjoining the inlet and outlet ends is defined by the housing and is adapted to reverse the direction of flow of the gas exiting the outlet end and entering the inlet end. Inlet and exhaust manifolds at the first and last heat exchangers in the series respectively serve to supply $H_2$-rich gas to the first heat exchanger and collect the gas from the last heat exchanger.

In a preferred embodiment, the present invention utilizes multiport air injection during normal or peak operating conditions of the fuel cell stack to improve the efficiency of the preferential oxidation of CO to $CO_2$ and reduce or eliminate the reverse water gas shift reaction. During turndown situations, air injection at the front of the reactor is substantially reduced and air is injected through injectors more distant from the inlet of the reactor and closer to the outlet of the reactor to reduce or eliminate the reverse water can shift reaction during turndown situations wherein a hydrogen-rich gas is still flowing through the reactor.

DESCRIPTION OF THE PREFERRED EMBODIMENT

Figure 1:
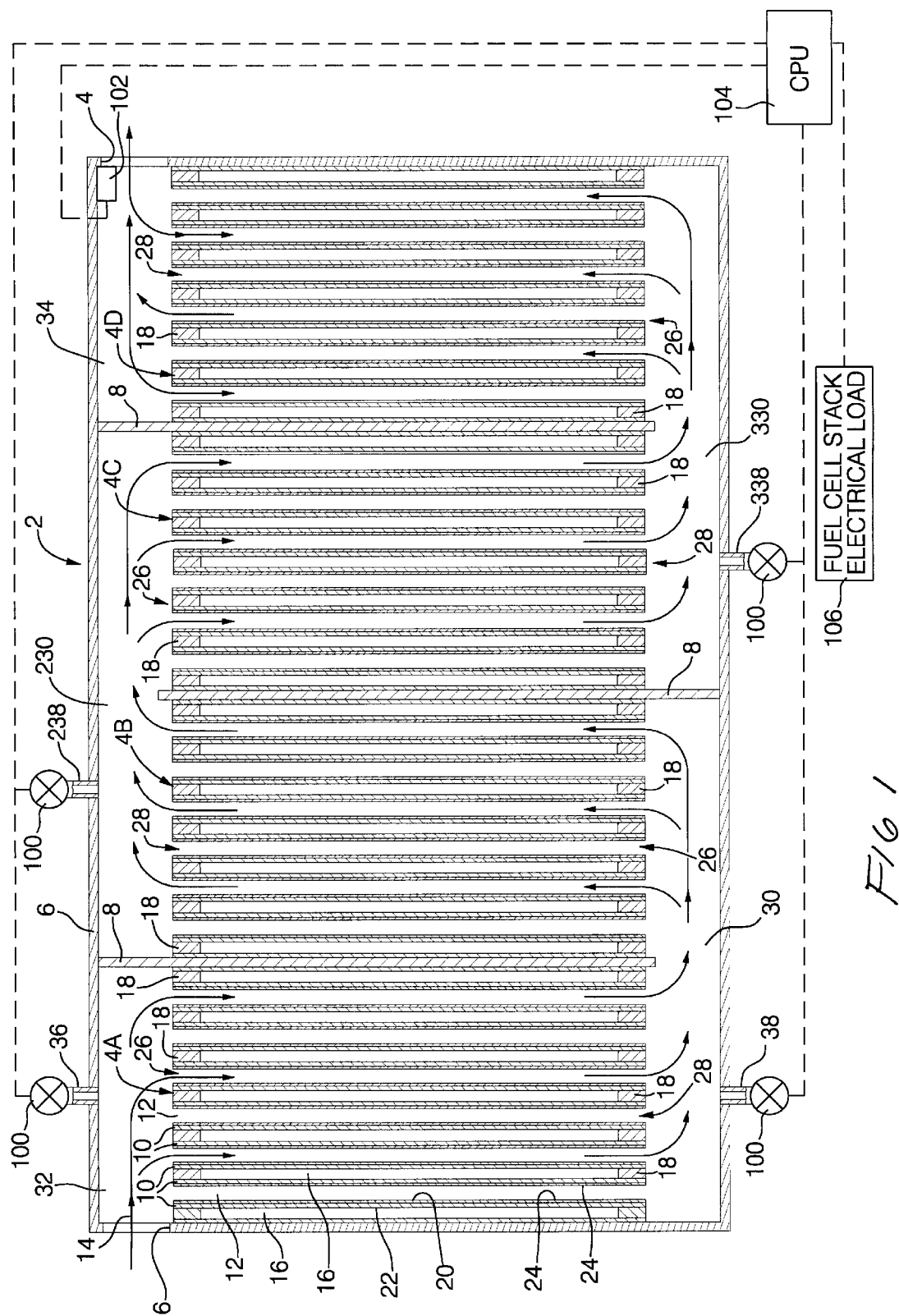
FIG. 1 illustrates, in side elevation, a multi-stage, isothermal PrOx reactor in accordance with this invention.

A process according to the present invention may be carried out in a fuel cell system, particularly a preferential oxidation reactor, as shown in U.S. Pat. No. 6,132,689 to Skala et al, issued Oct. 17, 2000, the disclosure of which is hereby incorporated by reference, and as described hereafter. FIG. 1 illustrates a multi-staged isothermal reactor for the selective reaction of carbon monoxide (CO) with oxygen (e.g., from air) in an $H_2$-rich gas to form $CO_2$ in the gas. The reactor 2 comprises a plurality of discrete heat exchanger 4A–4D arranged side by side in a common housing 6 with each heat exchanger 4A–4D separated one from the other by partitions 8. Each heat exchanger 4A–4D comprises a plurality of thermally conductive barriers (e.g. plates) 10 which separate the heat exchanger 4 into a plurality of first channels 12 through which the $H_2$-rich gas 14 flows and second channels 16 through which a coolant (i.e. gas is or liquid) flows in a direction transverse (e.g., 90 degrees) the direction of flow of the hydrogen-rich 14 through the first channels 12. The second channels 16 are further defined by spacer bars 18 which serve to space the barrier plates 10 from each other as well as seal off the edges of the barriers 10 to contain the coolant within the second channels 16. The barriers 10 have a first surface 20 confronting a first channel 12 and a second surface 22 confronting the second channel 16 for engagement with the coolant flowing in the second channel 16. A layer of catalyst 24 suitable to promoting the $O_2+CO$ reaction is deposited atop the first surface 20 and is contacted by a portion of the stream of hydrogen-rich gas 14 passing through the first channel 12. In this regard, the hydrogen-rich gas 14 will generally flow through the first passages 12 under laminar flow conditions such that layers of the gas at the boundaries of the stream 14 will contact the catalyst layer 24 and cause the carbon monoxide and oxygen to form carbon dioxide. As the gas progresses from the inlet ends 26 of each of the heat exchangers 4A–4D to the outlet ends 28 thereof, oxygen and carbon monoxide from the center layers of the stream will diffuse into the outer layers adjacent the catalyst 24, and cause that oxygen and carbon monoxide to react on the catalyst 24. However, some of the carbon monoxide and oxygen within the central layers of the gas stream remote from the catalyst 24 passes through the first heat exchanger 4A unreacted. Moreover, differences in catalyst activity, catalyst loading, gas flow rate, and temperature throughout the catalyzed heat exchanger 4A can result in the amount of carbon monoxide oxidation occurring in each first channel 12 to be different. Hence the amount of carbon monoxide and oxygen exiting first channels 12 of the first catalyzed heat exchanger 4A will not likely be the same. The same is true for the other heat exchangers 4B–4D.

In accordance with the present invention the catalyzed heat exchanger 4 is divided into at least two discrete segments (four segments 4A–4D are shown in FIG. 1), and each separated from the next by a mixing chamber 30 to substantially homogenize the gases exiting the previous (i.e. upstream) heat exchanger before it enters the subsequent (i.e. downstream) heat exchanger. The mixing chamber 30, 230, 330 is a confluence of the gas streams exiting the several first channels 12 of the heat exchangers 4A–4C and promotes mixing and homogenization of the gases. In this regard, depending on the volume of the mixing chambers 30, 230, 330 the gases exiting the outlet ends 28 expand by two to seven or more times as they enter the mixing chambers 30 causing their velocity to correspondingly decrease two to seven or more times which, in turn, promotes better mixing/homogenization of the gases.

Operationally, during normal or peak operating conditions of the fuel cell stack, CO-containing a hydrogen-rich gas 14 enters an inlet manifold 32 and hence inlet ends 26 of the first channels 12 of heat exchangers 4A, and exits the first channels 12 at outlet ends 28. At the same time, a suitable coolant (i.e. liquid or gas) flows in the second channels 16 in a direction perpendicular to the flow of the gas 14 to maintain the temperature of the heat exchangers substantially constant at a temperature suitable for promoting the $O_2+CO$ reaction while discouraging the reverse $CO_2+H_2$ reaction. For example in the case of a catalyzed heat exchanger having an iridium catalyst, the operating temperature of the catalyzed heat exchanger will generally be about 180° C. to about 240° C. which is sufficient to drive the forward $CO+O_2$ (PrOx reaction) but insufficient to promote a significant amount of the reverse water gas shift reaction to occur. Other catalysts (e.g., Group VIII metals) effect the PrOx reaction at different temperatures ranging from about 80° C. to about 260° C. The gases exiting outlet ends 28 of heat exchanger 4A are mixed together in a mixing chamber 30 before entering the next adjacent heat exchanger 4B. This process is repeated for heat exchangers 4C and 4D. Periodically homogenizing the gas en route through the reactor 2 results in a more efficient consumption of the carbon monoxide and utilization of the oxygen. The hydrogen-rich gas eventually exits the reactor 2 via exhaust manifold 34 from whence it flows to the fuel cell.

In accordance with a preferred embodiment of the present invention, during normal or peak operating conditions of the fuel cell stack, a portion of the oxygen/air inserted (e.g. injected) into the reactor 2 at the beginning (i.e. in the intake manifold 32) and the balance at one or more of the mixing chambers 30, 230, and/or 330. So inserting the oxygen/air at multi locations within the reactor allows for (1) better control of the reactor, and (2) a lower $O_2$ to CO ratio, and ensures that there will be at least some oxygen remaining for reaction near the outlet ends 28 of the channels 12 of the last heat exchanger 4D to reduce the possibility of the RWGS reaction occurring there. Otherwise, if all of the air/oxygen is depleted at the end point in the reactor, the catalyst 24 will promote the reverse water gas shift reaction thereby forming carbon monoxide defeating the purpose of the reactor. Injector 36 injects some of the air into the inlet manifold 32, while the remainder is injected into the several mixing chambers 30, 230, 330 via injectors 38, 238, 238. The injectors 36, 38, 238, 348 each may comprise a high pressure gas injector, well known in the art, or simply a valved tube or the like for controlling the amount of air entering the reactor therethrough. Valves 100 are associated with each oxygen (air) inlet port or injector 36, 238, 338, 438 and are preferably electronically controlled by a central processing unit (CPU) 104 in a manner known to those skilled in the art to inject air ($O_2$) into the reactor preferably at the mixing chambers 30, 230, 330 based on signal inputs received by the CPU 104 from a CO sensor 102 located in the reactor or down stream thereof, or from a feedback signal based on the a fuel cell stack electrical load 106, or based on other suitable feedback signal from the operation of the PrOx and/or fuel cell system.

In a preferred embodiment, a first air inlet or injector 36 is positioned adjacent the $H_2$ rich gas inlet opening 6 to the reactor. During normal (near steady state) operation of the fuel cell system (or when the fuel cell is being operated at near full power) a majority of the air (e.g., more than 50% of the total volumetric flow of air into the rector) would be injected into the reactor through the injector closest to $H_2$ rich gas inlet opening 6 to the reactor. However, during a turndown situation in which the electrical load demand on the fuel cell stack is reduced substantially, and $H_2$ rich gas is still flowing through the PrOx reactor but at a reduced flow rate than during normal or peak operating conditions. If the majority of the air continues to be injected through the injector 36 closest to the $H_2$ rich gas inlet opening 2 to the reactor then the undesirable reactions 2 and 3 described above are favorable. For operation during a turndown situations, it to has been discovered that if the majority of the air is injected through inlets or injectors down stream and further distant from the $H_2$ rich gas inlet opening 6 to the reactor then a sufficient amount of $O_2$ can be injected to prevent or substantially diminish the RWGS reaction and to prevent or substantially diminish the reaction of the $O_2$ with $H_2$ to form water and thus reduce efficiency. It has also been discovered that injecting air through inlets or injectors down stream and further distant from the $H_2$-rich gas inlet opening 6 to the reactor may require less air to prevent the RWGS than the amount of air that would be required if the air was injected further upstream, thus making the process more efficient. The location of the injection of the air and the amount would be dependent on the turndown in fuel cell stack electrical load demand. For example in a slight turndown (e.g., when the fuel cell stack electrical load is reduce 25%, or the flow rate of $H_2$-rich gas is less than 75% of the flow rate during normal operating conditions), a majority (more than 50–100%) of the air may be injected through the second inlet or injector 38 down stream from the $H_2$ rich gas inlet opening 6 to the reactor, and the balance of the air, if any, may be injected through the remaining down steam air inlets 238, 338. In a moderate turndown (e.g., when the fuel cell stack electrical load is reduce 50%, or the flow rate of $H_2$-rich gas is less than 50% of the flow rate during normal operating conditions), a majority (more than 50–100%) of the air may be injected through the third inlet or injector 238 down stream from the $H_2$ rich gas inlet opening 6 to the reactor, and the balance of the air, if any, may be injected through the remaining down steam air inlets 338. In a significant turndown (e.g., when the fuel cell stack electrical load is reduce 75%, or the flow rate of $H_2$-rich gas is less than 25% of the flow rate during normal operating conditions), a majority (more than 50–100%) of the air may be injected through the fourth inlet or injector 338 down stream from the $H_2$ rich gas inlet opening 6 to the reactor, and the balance of the air, if any, may be injected through the remaining air inlets 36, 38, 338.

Figure 2:
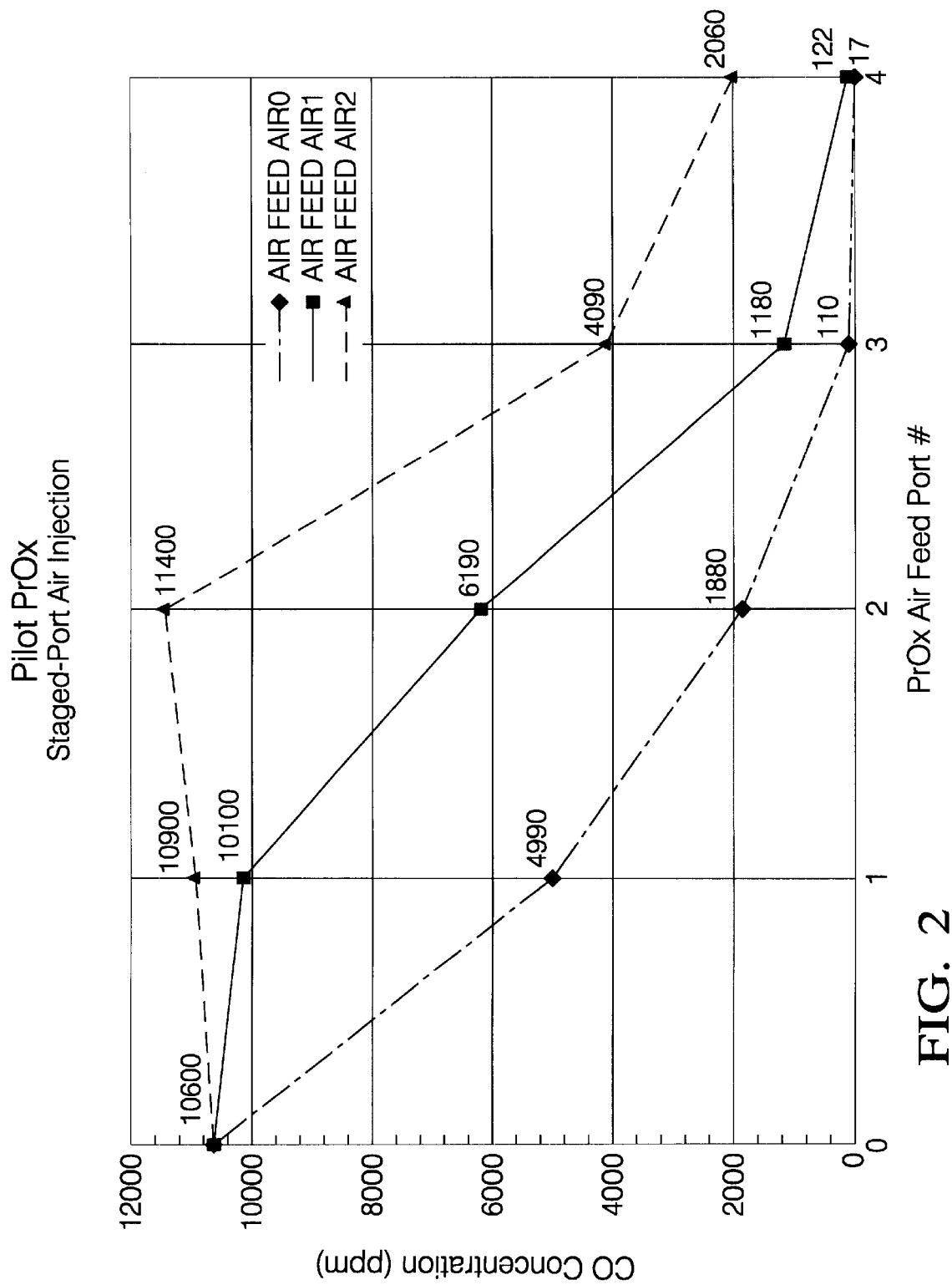
FIG. 2 is a graph of comparative data for certain tests.

FIG. 2 is a graph of the CO concentrations taken during experimental runs with the following feed composition: 15 mol. % $CO_2$, 32 mol. % $H_2$, 36 mol. % $N_2$, 0.9 mol. % CO, 1.3 mol. % $O_2$, and 15 mol. % $H_2O$. PrOx Air Feed Port #0 is used to indicate the feed gas concentration immediately before the feed gas enters (inlet 6) the PrOx reactor. PrOx Air Feed Port #1 is the closest air port to the feed gas inlet 6 to the PrOx reactor, and naturally PrOx Air Feed Port #2 is next closest to the feed gas inlet 6 PrOx Air Feed Port #3 is further distant from the feed gas inlet 6 than PrOx Air Feed Port #2, and PrOx Air Feed Port #4 is further distant from the feed gas inlet 6 than PrOx Air Feed Port #3. The runs were conducted at 230 degrees centigrade with a total flow rate of 16 standard liters per minute (SLPM) of the reformate feed gas. When all of the air was injected at the first injector 36 (AirO)(diamond symbols), the CO outlet from the PrOx was 110 ppm CO (dry levels of CO are on the graph next to data points). When the same amount of air was injected at the second injector 38 (Air1)(square symbols) the CO outlet from the PrOx was 125 ppm. When the air is injected at the third injector 238 (Air2) (triangle symbols) the CO outlet from the PrOx was 2000 ppm CO. Thus the CO concentration exiting the PrOx in a turndown situation is not adversely impacted by injecting the air substantially down steam of the reactor inlet 6. Injecting the air down stream from the reactor inlet 6 provides enough $O_2$ to prevent the RWGS reaction, and also deduces the residence time for the undesirable reaction of $O_2$ and $H_2$.

What is claimed is:

1. A process of operating a preferential oxidation reactor in response to a significant change in the flow rate of a $H_2$-rich gas flowing through the reactor, wherein the reactor is an isothermal reactor for the selective reaction of $O_2$ with CO in said gas to form $CO_2$, said reactor including an inlet and an exit for the $H_2$-rich gas and a plurality of air injectors positioned along the length of the flow path of the $H_2$-rich gas, and said plurality of injectors including a first injector being positioned relatively closer to the inlet for the $H_2$-rich gas, comprising:

during normal operating conditions of the fuel cell stack wherein the flow rate of the $H_2$-rich gas is at a level X, injecting a relative amount of air into the reactor through at least the first injector relatively closer to inlet for the $H_2$-rich gas;

during a turndown condition of the fuel cell stack wherein the flow rate of the $H_2$-rich gas is substantial less than level X, reducing the amount of air injected through the first injector relatively closer to the inlet for the $H_2$-rich gas, and injecting a majority of the air through a second injector being positioned at a location more distant from the inlet for the $H_2$-rich gas than the first injector to provide unfavorable conditions for a reverse water gas shift reaction and control the CO concentration exiting the reactor during the turndown condition.

2. A process as set forth in claim 1 wherein during the turndown condition the $H_2$-rich gas flow rate is less than 75 percent of X.

3. A process as set forth in claim 1 wherein during the turndown condition the $H_2$-rich gas flow rate is less than 50 percent of X.

4. A process as set forth in claim 1 wherein during the turndown condition the $H_2$-rich gas flow rate is less than 25 percent of X.

5. A process as set forth in claim 1 wherein during the turndown condition the $H_2$-rich gas flow rate is less than 5 percent of X.

6. A process of operating a preferential oxidation reactor in response to a significant change in the flow rate of a $H_2$-rich gas flowing through the reactor, wherein the reactor is an isothermal reactor for the selective reaction of $O_2$ with CO in said gas to form $CO_2$, said reactor including an inlet and an exit for the $H_2$-rich gas and a plurality of air injectors positioned along the length of the flow path of the $H_2$-rich gas, and said plurality of injectors including at least a first injector being positioned relative closer to the inlet for the $H_2$-rich gas, a second reactor positioned a greater distance from the inlet for the $H_2$-rich gas than the first injector, and a third injector position a greater distance from the inlet for the $H_2$-rich gas than from the second injector, comprising:

during normal operating conditions of the fuel cell stack wherein the flow rate of the $H_2$-rich gas is at a level X, injecting a relative amount of air into the reactor through at least the first injector relatively closer to inlet for the $H_2$-rich gas;

during a turndown condition of the fuel cell stack wherein the flow rate of the $H_2$-rich gas is substantial less than level X, reducing the amount of air injected through the first injector relatively closer to the inlet for the $H_2$-rich gas, and injecting a majority of the air through an injector being more distant from the inlet for the $H_2$-rich gas than the first injector to provide unfavorable conditions for a reverse water gas shift reaction and control the CO concentration exiting the reactor during the turndown condition.

7. A process as set forth in claim 6 wherein during the turndown condition a majority of the air is injected through the second injector.

8. A process as set forth in claim 6 wherein during the turndown condition at least 85 percent of the air is injected through the second injector.

9. A process as set forth in claim 6 wherein during the turndown condition substantially all of the air is injected through the second injector.

10. A process as set forth in claim 7 wherein during the turndown condition the $H_2$-rich gas flow rate is less than 75 percent of X.

11. A process as set forth in claim 7 wherein during the turndown condition the $H_2$-rich gas flow rate is less than 50 percent of X.

12. A process as set forth in claim 6 wherein during the turndown condition a majority of the air is injected through the third injector.

13. A process as set forth in claim 6 wherein during the turndown condition at least 85 percent of the air is injected through the third injector.

14. A process as set forth in claim 6 wherein during the turndown condition substantially all of the air is injected through the third injector.

15. A process as set forth in claim 12 wherein during the turndown condition the $H_2$-rich gas flow rate is less than 50 percent of X.

16. A process as set forth in claim 12 wherein during the turndown condition the $H_2$-rich gas flow rate is less than 25 percent of X.

17. A process as set forth in claim 12 wherein during the turndown condition the flow rate is less than 5 percent of X.

18. A process of operating a preferential oxidation reactor in response to a significant change in the electrical low demand of an associated fuel cell stack, wherein the reactor is an isothermal reactor for the selective reaction of $O_2$ with CO, in a $H_2$-rich gas flowing through the reactor, to form $CO_2$, said reactor including an inlet and an exit for the $H_2$-rich gas and a plurality of air injectors positioned along the length of the flow path of the $H_2$-rich gas, and said plurality of injectors including a first injector being positioned relative closer to the inlet for the $H_2$-rich gas, comprising:

during normal operating conditions of the fuel cell stack wherein electrical load demand of the fuel cell stack is at a level X, injecting a relative amount of air into the reactor through at least the first injector relatively closer to inlet for the $H_2$-rich gas;

during a turndown condition of the fuel cell stack wherein the electrical load demand of the fuel cell stack is substantial less than level X, reducing the amount of air injected through the first injector relatively closer to the inlet for the $H_2$-rich gas, and injecting a majority of the air through a second injector being positioned at a location more distant from the inlet for the $H_2$-rich gas than the first injector to provide unfavorable conditions for a reverse water gas shift reaction and control the CO concentration exiting the reactor during the turndown condition.

* * * * *